3,222,301
PREPARATION OF A POLYURETHANE FOAM
CONTAINING ELEMENTAL SULPHUR
Manfred Dahm, Leverkusen, Germany, assignor to Farbenfabriken Bayer Aktiengesellschaft, Leverkusen, Germany, a German corporation
No Drawing. Filed Nov. 20, 1961, Ser. No. 153,712
Claims priority, application Germany, Dec. 24, 1960, F 32,846
6 Claims. (Cl. 260—2.5)

Foam materials having very different physical properties have been prepared for a long time on an industrial scale by the isocyanate polyaddition process from compounds containing a plurality of active hydrogen atoms (especially compounds containing hydroxyl and/or carboxyl groups) and polyisocyanates, if necessary with the concurrent use of water, activators, emulsifiers and other additives (Angewandte Chemie, A–59, page 257, 1948; handbook "Bayer-Kunststoffe," 1955). When using this procedure, it is possible by suitable choice of the reactants to produce both elastic and rigid foam materials, as well as foam materials having intermediate properties.

Foam materials having a polyisocyanate base are preferably prepared by mixing liquid reactants. The liquid reactants may be either simultaneously mixed together or an initial addition product containing —NCO groups may first be prepared from a polyhydroxy compound and an excess of polyisocyanate and the initial addition product may then be transformed into the foam material in a second stage with water. A suitable process for making foams is disclosed in U.S. Reissue 24,514.

Undesired discoloration phenomena occurs in the foamed block in the case of foam materials of low weight per unit volume or when a relatively large quantity of isocyanate is employed. A yellowish to brownish color tone is observed in the middle of the foamed blocks, where the temperature rises most because of the heat of reaction.

Attempts have already been made to prevent the aforementioned undesired discoloration of the core by carrying out the foaming in the presence of an organic nitro and/or a nitroso compound. Although the addition of these compounds prevents discoloration of the core of the foam material during its production it has been found that the core of the foamed material becomes yellow after the foamed material has been in use for some time. Moreover, the nitro and nitroso compounds are not absolutely unobjectionable from a physiological point of view.

It is an object of this invention to provide a process for making foam devoid of the foregoing disadvantages. A more specific object of the invention is to provide a method for making polyurethane foam blocks which do not discolor in the middle thereof.

It has now been found that the aforementioned undesired discolorations can be prevented when preparing foam materials having an isocyanate base from polyhydroxy and/or polycarboxyl compounds, polyisocyanates and, if desired, water, if the reaction is carried out in the presence of elementary sulphur.

Many types of compounds containing hydroxyl and/or carboxyl groups are suitable for the production of foam materials. Examples of such compounds are linear or branched polyesters prepared from monofunctional or polyfunctional alcohols and carboxylic acids or hydroxy carboxylic acids by known processes, which polyesters may also contain hetero atoms and double or triple bonds. Also suitable are saturated or unsaturated fatty acids or fatty alcohols, linear or branched polyester amides, linear or branched polyalkylene ethers or thioethers, ethers containing terminal hydroxyl groups prepared from diols or polyols and styrene oxide, as well as epoxy resins, hydrogenation products of ethylene-olefine-carbon monoxide copolymers and phenol-formaldehyde resins which have been reacted with alkylene oxides.

Any suitable organic polyisocyanate may be used in the process of the present invention including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3' - dimethyl - 4,4' - biphenylene diisocyanate, 3,3' - dimethoxy-4,4'-biphenylene diisocyanate, 3,3'-diphenyl-4,4'-biphenylene diisocyanate, 4,4'-biphenylene diisocyanate, 3,3' - dichloro - 4,4' - biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'-diphenylmethane diisocyanate.

Any suitable organic compound containing at least two active hydrogen containing groups as determined by the Zerewitinoff method, said groups being reactive with an isocyanate group, may be reacted with an organic polyisocyanate in the presence of the chlorinated or brominated unsaturated fatty acid in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain a free primary amino group and an hydroxyl group, amino alcohols which contain two free primary amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups may vary over a wide range. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. These compounds most preferably have hydroxyl numbers of from about 50 to about 350, the best results being obtained with those having an hydroxyl number from about 50 to about 250. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate and other components can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassyiic acid, thapsic acid, maleic acid, fumaric acid, glutaconic acid, α-hydromuconic acid, β-hydromuconic acid, α-butyl-α-ethyl-glutaric acid, α-β-diethylsuccinic acid, α-phthalic acid, isophthalic acid, terephthalic acid, hemimellitic acid, trimellitic acid, trimesic acid, mellophanic acid, prehnitic acid, pyromellitic acid, citric acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, butene-1,4-diol, 1,5-pentane diol, 1,4-pentane diol, 1,3-pentane diol, 1,6-hexane diol, hexene-1,1-diol, 1,7-heptane diol, diethylene glycol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol having only one free hydroxyl group and at least one free primary amine group in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

The discoloration of the core which occurs in the conventional foaming operations is prevented in the process according to the present invention by the presence of the elementary sulphur during foaming. It is preferable to employ the elementary sulphur in the finest possible dispersion. The elementary sulphur may be added to the reaction mixture as such or in the form of a solution in one of the reactants and also in colloidal form, if desired. In carrying out the reaction, the starting materials, especially the polyhydroxy compound, may be filtered through sulphur, whereby a sufficient quantity of sulphur is dissolved in the polyhydroxy compound. Alternatively, hydrogen sulphide and sulphur dioxide may be introduced into the polyhydroxy compound, whereby colloidal sulphur is formed in the latter. Only traces of elementary sulphur are necessary in order to prevent the core from becoming discolored. Generally quantities of 0.01% and upwards based on the weight of polyhydroxy compound are sufficient. Seldom will more than about one percent be used.

It has been found to be practicable to prepare a concentrated and if desired colloidal "stock solution" of elementary sulphur and to add this "stock solution" in portions to the mixture to be foamed.

The actual production of the foam material is effected by known processes at room temperature or elevated temperature, for example by simply mixing the polyisocyanate with the compound containing the hydroxyl and/or carboxyl groups. Water, accelerators, emulsifiers and other auxiliaries, for example silicone oils, may be concurrently employed if desired. (The addition of water may be superfluous in those cases in which polyesters or other compounds of high molecular weight containing free carboxyl groups are employed as the compound containing a plurality of active hydrogen atoms or in which low boiling liquids, for example haloalkanes, are employed as blowing agents.) It is expedient to use in such cases mechanical devices such as those described for example in French patent specification No. 1,074,713. If a blowing agent such as a halohydrocarbon, for example, dichlorodifluoromethane, trichlorofluoromethane or the like is included in the reaction mixture, the water may be eliminated.

The invention is further illustrated by the following examples in which the parts are by weight unless otherwise indicated.

*Example 1*

About 100 parts by weight of a branched polypropylene glycol (OH number about 56) about 45.5 parts by weight of toluylene diisocyanate, about 1.5 parts by weight of a residue of a polysiloxane containing polyalkylene ether glycol groups, about 0.3 part by weight of endoethylene, piperazine, about 0.05 part by weight of dibutyl tin dilaurate and about 2.6 parts by weight of water are intimately mixed and the foamable reaction mixture is poured into molds. After the foam material has been cured at room temperature it is found to have a core which is very dark brown in color.

If the polypropylene glycol in the reaction mixture employed in the comparison example is heated beforehand to about 50° C. and allowed to run through a filter in which finely divided sulphur is formed, then with the subsequent foaming a foam material is formed which is snow white both on the surface and also internally.

*Example 2*

Hydrogen sulphide and sulphur dioxide are simultaneously introduced into a branched polypropylene glycol (OH number about 56), for half an hour while stirring. The polyether becomes cloudy, due to the colloidal sulphur which precipitates. If about 5% of the branched polypropylene glycol in the foaming recipe of Example 1 is replaced by the polyether containing colloidal sulphur prepared as described above, a foam material is obtained which is snow white both on the surface and also internally.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In the preparation of a polyurethane foam by a process wherein a foamable polyurethane composition is prepared by mixing an organic polyisocyanate with an organic compound having at least two reactive hydrogen atoms determined by the Zerewitinoff method, said organic compound being capable of reacting with the organic polyisocyanate to form a polyurethane, the improvement which comprises including elemental sulphur in the foamable reaction mixture which produces the foam.

2. The process of claim 1 wherein the sulphur is colloidal sulphur.

3. The process of claim 1 wherein the said organic compound having reactive hydrogen is a polyalkylene ether polyhydric alcohol.

4. In the preparation of a polyurethane foam by a process wherein an organic polyisocyanate and an organic compound having reactive hydrogen atoms determinable by the Zerewitinoff method, said organic compound being capable of reacting with polyisocyanate to form a polyurethane, are mixed to form a foamable reaction mixture, the improved method of preparing a foam while avoiding discoloration in the center of the resulting block thereof which comprises passing the organic compound having reactive hydrogens through finely divided sulphur prior to its incorporation in the foamable mixture whereby the sulphur is dissolved in the said organic compound.

5. In the preparation of a polyurethane foam by a process wherein an organic polyisocyanate and an organic compound having reactive hydrogen atoms determinable by the Zerewitinoff method, said organic compound being capable of reacting with polyisocyanate to form a polyurethane, are mixed to form a foamable reaction mixture, the improved method of preparing a foam while avoiding discoloration in the center of the resulting block thereof which comprises mixing the said organic compound having reactive hydrogens with colloidal sulphur prior to its incorporation in the foamable composition.

6. The process of claim 4 wherein the reactive hydrogen compound is a polyalkylene ether polyhydric alcohol.

References Cited by the Examiner

UNITED STATES PATENTS

| 2,227,985 | 1/1941 | Swann | 260—45.7 |
| 2,948,691 | 8/1960 | Windemuth et al. | 260—2.5 |
| 3,053,778 | 9/1962 | Toone | 260—2.5 |

LEON J. BERCOVITZ, *Primary Examiner.*